(12) United States Patent
Wang et al.

(10) Patent No.: US 11,557,752 B2
(45) Date of Patent: Jan. 17, 2023

(54) METHOD FOR PREPARING ANODE MATERIAL FOR LITHIUM ION BATTERY OF SIC NANOPARTICLE ENCAPSULATED BY NITROGEN-DOPED GRAPHENE

(71) Applicant: Dongguan University Of Technology, Guangdong (CN)

(72) Inventors: Yan-Jie Wang, Guangdong (CN); Changlong Sun, Guangdong (CN); Peng Zhang, Guangdong (CN); Tao Wang, Guangdong (CN); Dan Liu, Guangdong (CN); Weijie Ma, Guangdong (CN)

(73) Assignee: DONGGUAN UNIVERSITY OF TECHNOLOGY

( * ) Notice: Subject to any disclaimer, the term of this patent is extended or adjusted under 35 U.S.C. 154(b) by 0 days.

(21) Appl. No.: 17/477,948

(22) Filed: Sep. 17, 2021

(65) Prior Publication Data
US 2022/0093911 A1    Mar. 24, 2022

(30) Foreign Application Priority Data

Sep. 24, 2020 (CN) .......................... 202011018129.7

(51) Int. Cl.
| | |
|---|---|
| *H01M 4/139* | (2010.01) |
| *H01M 4/36* | (2006.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC .......... *H01M 4/139* (2013.01); *H01M 4/366* (2013.01); *H01M 4/587* (2013.01); *H01M 4/625* (2013.01); *H01M 10/0525* (2013.01); *H01M 2004/027* (2013.01)

(58) Field of Classification Search
CPC ................................................. H01M 2004/027
See application file for complete search history.

(56) References Cited

FOREIGN PATENT DOCUMENTS

| | | |
|---|---|---|
| CN | 102190294 A | 9/2011 |
| CN | 103864064 A | 6/2014 |
| WO | 2018052318 A1 | 3/2018 |

OTHER PUBLICATIONS

Coleman et al. "Plasmonic core-shell silicon carbide-graphene nanoparticles" (2019).*
Wang et al. "N-doping of graphene through electrothermal reactions with ammonia" (2009).*
Banks et al. "Graphene Encapsulated Silicon Carbide Nanocomposites for High and Low Power Energy Storage Applications" (2017).*
First Office Action issued in corresponding Chinese Application No. 202011018129.7 (English-language translation attached).
Second Office Action issued in corresponding Chinese Application No. 202011018129.7 (English-language translation attached).

* cited by examiner

*Primary Examiner* — Austin Murata
(74) *Attorney, Agent, or Firm* — Jeffrey C. Watson; Grell & Watson Patent Attorneys LLC

(57) ABSTRACT

The present disclosure discloses a method for preparing an anode material for lithium ion battery of a SiC nanoparticle encapsulated by nitrogen-doped graphene. The method includes: in an ammonia atmosphere, heating a SiC nanoparticle for a predetermined time, and cooling to obtain the SiC nanoparticle encapsulated by nitrogen-doped graphene.

9 Claims, 4 Drawing Sheets

METHOD FOR PREPARING ANODE MATERIAL FOR LITHIUM ION BATTERY OF SIC NANOPARTICLE ENCAPSULATED BY NITROGEN-DOPED GRAPHENE

CROSS-REFERENCE TO RELATED APPLICATIONS

This patent application claims the benefit and priority of Chinese Patent Application No. 202011018129.7 filed on Sep. 24, 2020, the disclosure of which is incorporated by reference herein in its entirety as part of the present application.

TECHNICAL FIELD

The present disclosure relates to the technical field of novel anode materials for lithium ion batteries, and in particular to a method for preparing an anode material for lithium ion battery of a SiC nanoparticle encapsulated by nitrogen-doped graphene.

BACKGROUND ART

Currently, the commercial lithium ion batteries generally use graphite as an anode material, and use lithium nickel manganese cobalt oxide (NMC) as a cathode material. Among them, the graphite anode has a theoretical mass specific capacity of 370 mAh·g$^{-1}$ (without lithiation), a crystal density of 2.266 g·cm$^{-3}$, and a volume specific capacity of 841 mAh·cm$^{-3}$ (without lithiation) or 719 mAh·cm$^{-3}$ (with lithiation). Therefore, when matched with commercial cathode materials, graphite may account for 55-60% of the total battery volume. In addition, the graphite anode has the problem of lithium dendrites at high rates, which severely restricts the application of lithium ion batteries with a graphite anode. At present, the commonly used means to improve the transport efficiency of ions in electrode materials is to shorten the transport distance of ions by adjusting the morphology and the particle size. However, since the charge and discharge processes involve the transfer of multiple electrons and multiple ions, the adjustment of the morphology and particle size cannot fundamentally change the slow kinetic process of the electrode material itself, which can lead to a significant reduction in the rate capability and cycle life of lithium ion batteries.

In summary, it is important to design a cost-effective anode material for lithium ion battery that has good structural stability and could achieve rapid electron transfer and ion transfer.

SUMMARY

In order to solve the above problems, the present disclosure provides a method for preparing an anode material for lithium ion battery of a SiC nanoparticle encapsulated by nitrogen-doped graphene. The method could achieve the rapid electron transfer of lithium ion batteries.

According to a first aspect, a method for preparing an anode material for lithium ion battery of a SiC nanoparticle encapsulated by nitrogen-doped graphene is provided, comprising: in an ammonia atmosphere, heating a SiC nanoparticle for a predetermined time, and cooling to obtain the SiC nanoparticle encapsulated by nitrogen-doped graphene.

In some embodiments, a preparation process of the SiC nanoparticle encapsulated by nitrogen-doped graphene includes:

S1. weighing a certain mass of SiC nanoparticles and placing in a container, and placing the container with the certain mass of SiC nanoparticles in a heating system;

S2. evacuating air in the heating system, and then introducing ammonia into the heating system until the heating system reaching normal pressure;

S3. heating the heating system while continuously introducing ammonia into the heating system; and S4. turning off a power supply, stopping introducing ammonia, and naturally cooling the heating system to room temperature in ammonia.

In some embodiments, the SiC nanoparticle encapsulated by nitrogen-doped graphene has a diameter of 100-300 nm.

In some embodiments, the container is a horizontal high-temperature tube furnace with single temperature zone, and the SiC nanoparticles are placed in a middle position of a furnace tube of the horizontal high-temperature tube furnace with single temperature zone.

In some embodiments, the horizontal high-temperature tube furnace with single temperature zone is equipped with an air extraction device, and the air extraction device allows evacuating air pressure inside the horizontal high-temperature tube furnace with single temperature zone.

In some embodiments, the horizontal high-temperature tube furnace with single temperature zone is further equipped with an air charging device, and after the air inside the horizontal high-temperature tube furnace with single temperature zone is evacuated to a negative pressure, the air charging device is used to introduce ammonia into the horizontal high-temperature tube furnace with single temperature zone until the pressure in the horizontal high-temperature tube furnace with single temperature zone returns to normal pressure.

In some embodiments, when the air charging device is used to introduce ammonia into the horizontal high-temperature tube furnace with single temperature zone, the flow rate of ammonia is 150 sccm.

The technical effect is explained as follows. In the method, all the air inside the horizontal high-temperature tube furnace with single temperature zone is evacuated, and then ammonia is introduced. This is for the purpose of studying the SiC nanoparticles heated at high temperatures in an environment with only ammonia. In this case, the graphene formed on the surface of the SiC nanoparticles may only be nitrogen-doped graphene, rather than graphene doped with other elements.

In some embodiments, the heating of the horizontal high-temperature tube furnace with single temperature zone is performed by increasing a temperature to 1500° C. at a heating rate of 10° C. per minute, and holding for a certain time at 1500° C.

In some embodiments, the time for holding at 1500° C. of the horizontal high-temperature tube furnace with single temperature zone is 5-10 min.

In some embodiments, after the temperature holding of the horizontal high-temperature tube furnace with single temperature zone is completed, the power supplies are all turned off, and the horizontal high-temperature tube furnace with single temperature zone is naturally cooled to room temperature, with the SiC nanoparticle being prepared into the SiC nanoparticle encapsulated by nitrogen-doped graphene.

The technical effect is explained as follows. In the preparation method of the present disclosure, the high-temperature ammonia atmosphere accelerates the breaking of the Si—C chemical bonds in SiC, and the remaining C atoms exist on the surface layer of the SiC nanoparticles in the form of graphene. At the same time, due to the effect of ammonia, the nitrogen-doped graphene may be obtained. Due to the existence of Si—C between the SiC particles and the nitrogen-doped graphene, the formed nitrogen-doped graphene may tightly encapsulate the SiC nanoparticles across their surfaces to form an encapsulating structure.

Further, in the present disclosure, two kinds of SiC nanoparticles encapsulated by nitrogen-doped graphene with different thicknesses are obtained. Among them, the nitrogen-doped graphene on the surface of the SiC nanoparticle encapsulated by nitrogen-doped graphene after 5 min of ammoniation and heat preservation has a thickness of 10 nm, and the nitrogen-doped graphene on surface of the SiC nanoparticle encapsulated by nitrogen-doped graphene after 10 min of ammoniation and heat preservation has a thickness of 20 nm. Thus, it may be inferred that with the increase in ammoniation time, the thickness of the nitrogen-doped graphene gradually increases, and it may be further inferred that the thickness of the nitrogen-doped graphene can be controlled by controlling the ammoniation time. Moreover, the nitrogen-doped graphene with the two thicknesses may basically maintain the morphology of complete particles, without showing the phenomenon of a large-scale agglomeration.

It is also explained that in the SiC nanoparticles encapsulated by nitrogen-doped graphene obtained in the present disclosure, the nitrogen-doped graphene monomer has a shape of a regular hexagon. Compared with general graphene, the monomer structure of the nitrogen-doped graphene corresponds to the general graphene monomer except that any one of the carbon atoms is replaced by a nitrogen atom. However, this does not mean that each graphene monomer has a carbon atom to be replaced by a nitrogen atom. In other words, in the present disclosure, in the entire layer of nitrogen-doped graphene, only a minority of graphene monomers doped with nitrogen atoms are generated.

The present disclosure has the following beneficial effects: the present disclosure provides an anode material for lithium ion battery of a SiC nanoparticle encapsulated by nitrogen-doped graphene, and the preparation steps are simple. The SiC nanoparticle encapsulated by nitrogen-doped graphene has good electrolyte wettability, and it could further enhance the rapid transport of electrons and lithium ions in the charging process and discharging process as an anode material for lithium ion batteries, which makes the electrode of the SiC nanoparticles encapsulated by nitrogen-doped graphene has a rate characteristic superior to that of the reported SiC electrode materials.

DETAILED DESCRIPTION OF THE EMBODIMENTS

Figure 1:
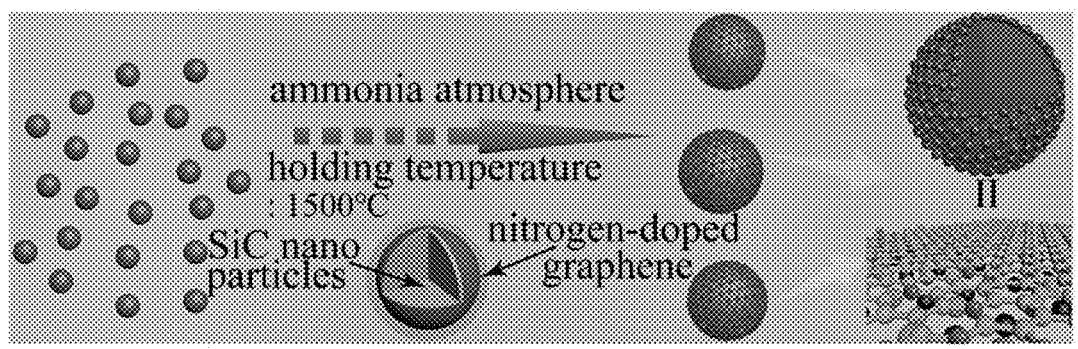
FIG. 1 is a schematic diagram of the preparation of SiC nanoparticle encapsulated by nitrogen-doped graphene in an example of the present disclosure.

1. The apparatus required for the preparation of the SiC nanoparticle encapsulated by nitrogen-doped graphene:
A horizontal high-temperature tube furnace with single temperature zone and a corundum boat.

2. The reagents required for the preparation of the SiC nanoparticle encapsulated by nitrogen-doped graphene:
SiC nanoparticles with a diameter of 100-300 nm and ammonia.

3. The preparing process of the SiC nanoparticle encapsulated by nitrogen-doped graphene:
In the ammonia atmosphere, SiC nanoparticles are heated for a predetermined time, and cooled to obtain the SiC nanoparticles encapsulated by nitrogen-doped graphene.

In some embodiments, a method for preparing the SiC nanoparticle encapsulated by nitrogen-doped graphene is performed by the following steps:
S1. a certain mass of SiC nanoparticles are weighed and placed in a container, and the container with the certain mass of SiC nanoparticles is placed in a heating system;
S2. the air in the heating system is evacuated, and then ammonia is introduced into the heating system until the heating system reaches normal pressure;
S3. the heating system is heated while ammonia is continuously introduced into the heating system;
S4. a power supply is turned off, ammonia is stopped being introduced, and the heating system is naturally cooled to room temperature in ammonia.

In some embodiments, the SiC nanoparticle has a diameter of 100-300 nm.

In some embodiments, the container is a horizontal high-temperature tube furnace with single temperature zone, and the SiC nanoparticles are placed in a middle position of a furnace tube of the horizontal high-temperature tube furnace with single temperature zone.

In some embodiments, the horizontal high-temperature tube furnace with single temperature zone is further equipped with an air charging device, and after the air inside the horizontal high-temperature tube furnace with single temperature zone is evacuated to a negative pressure, the air charging device is used to introduce ammonia into the horizontal high-temperature tube furnace with single temperature zone until the pressure in the horizontal high-temperature tube furnace with single temperature zone returns to normal pressure.

In some embodiments, when the air charging device is used to introduce ammonia into the horizontal high-temperature tube furnace with single temperature zone, the flow rate of ammonia is 150 sccm.

The technical effect is explained as follows. In the method, all the air inside the horizontal high-temperature tube furnace with single temperature zone is evacuated, and then ammonia is introduced. This is for the purpose of studying the SiC nanoparticles heated in an environment with only ammonia. In this case, the graphene formed on the surface of the SiC nanoparticles may only be nitrogen-doped graphene, rather than graphene doped with other elements.

In some embodiments, the heating of the horizontal high-temperature tube furnace with single temperature zone is performed by increasing the temperature to 1500° C. at a heating rate of 10° C. per minute, and holding for a certain time at 1500° C.

In some embodiments, the time for holding at 1500° C. of the horizontal high-temperature tube furnace with single temperature zone is 5-10 min.

In some embodiments, after the temperature holding of the horizontal high-temperature tube furnace with single temperature zone is completed, the power supplies are all turned off, and the horizontal high-temperature tube furnace with single temperature zone is naturally cooled to room temperature, with the SiC nanoparticle being prepared into the SiC nanoparticle encapsulated by nitrogen-doped graphene.

An example is provided, wherein the SiC nanoparticles were held at 1500° C. for 5 min in a horizontal high-temperature tube furnace with single temperature zone in the ammonia atmosphere.

An example is provided, wherein the SiC nanoparticles were held at 1500° C. for 10 min in a horizontal high-temperature tube furnace with single temperature zone in the ammonia atmosphere.

As shown in FIG. 1, which is a schematic diagram of the preparation of the SiC nanoparticle encapsulated by nitrogen-doped graphene, in the preparation method of the present disclosure, the high-temperature ammonia atmosphere accelerates the breaking of the Si—C chemical bonds in SiC, and the remaining C atoms exist on the surface layer of the SiC nanoparticles in the form of graphene. At the same time, due to the effect of ammonia, nitrogen-doped graphene may be obtained. Due to the existence of Si—C that acts as an internal lining of the SiC particles, the formed nitrogen-doped graphene may tightly encapsulate the SiC nanoparticles across their surfaces to form an encapsulating structure.

Figure 2:
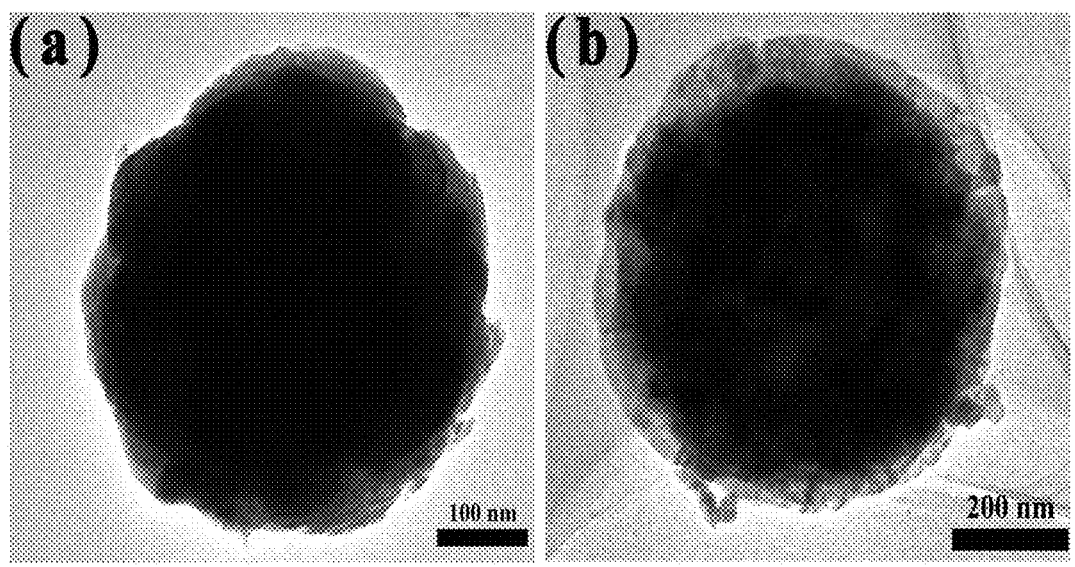
FIG. 2 is a TEM image of two SiC nanoparticles encapsulated by nitrogen-doped graphene with different thicknesses in an example of the present disclosure.

As shown in FIG. 2, which is a TEM image of two SiC nanoparticles encapsulated by nitrogen-doped graphene with different thickness, (a) represents the SiC nanoparticle that has been subjected to an ammoniation treatment at high temperature for 5 min, and (b) represents the SiC nanoparticle that has been subjected to an ammoniation treatment at high temperature for 10 min. It may be seen that the nitrogen-doped graphene on the surface of the SiC nanoparticle after 10 min of high-temperature ammoniation treatment has a thickness of about 20 nm, and the thickness of the SiC nanoparticle after 5 min of high-temperature ammoniation treatment is about 10 nm. It may be seen from intuitive vision that with the increase in ammoniation time, the thickness of the nitrogen-doped graphene on the surface of SiC nanoparticles increases.

Figure 3:
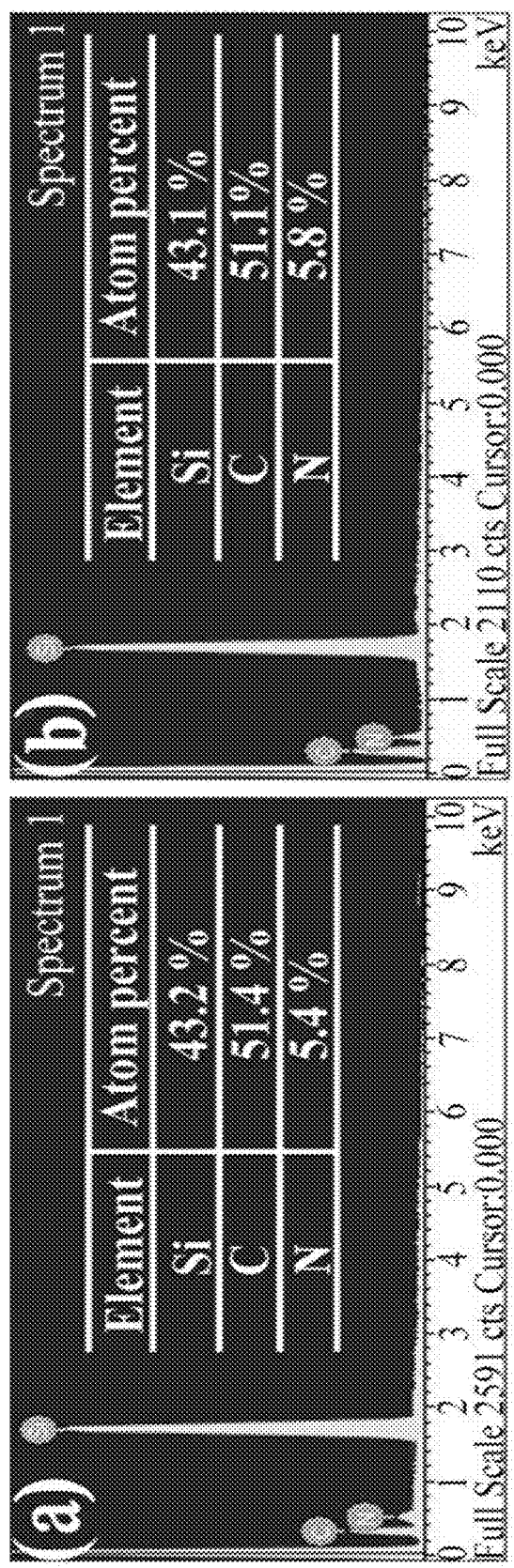
FIG. 3 is an EDS diagram of two SiC nanoparticles encapsulated by nitrogen-doped graphene with different thicknesses in an example of the present disclosure.

As shown in FIG. 3, which is an energy dispersive spectrum (EDS) diagram of two SiC nanoparticles encapsulated by nitrogen-doped graphene with different thickness, (a) represents the SiC nanoparticle that has been subjected to an ammoniation treatment at high temperature for 5 min, and (b) represents the SiC nanoparticle that has been subjected to an ammoniation treatment at high temperature for 10 min. From the EDS analysis on the SiC nanoparticles encapsulated by nitrogen-doped graphene after 5 min of ammoniation and heat preservation and the SiC nanoparticles encapsulated by nitrogen-doped graphene after 10 min of ammoniation and heat preservation, it may be seen that the greater the thickness of the nitrogen-doped graphene is, the greater the proportion of nitrogen element is, and the smaller the proportion of carbon element is. This proves that the longer the time for the ammoniation and heat preservation lasts, the more nitrogen-doped graphene is generated on the surface of SiC nanoparticles.

Further, in the present disclosure, two kinds of SiC nanoparticles encapsulated by nitrogen-doped graphene with different thicknesses are obtained. Among them, the nitrogen-doped graphene on the surface of the SiC nanoparticle encapsulated by nitrogen-doped graphene after 5 min of ammoniation and heat preservation has a thickness of 10 nm, and the nitrogen-doped graphene on surface of the SiC nanoparticle encapsulated by nitrogen-doped graphene after 10 min of ammoniation and heat preservation has a thickness of 20 nm. Thus, it may be inferred that with the increase in ammoniation time, the thickness of the nitrogen-doped graphene gradually increases, and it may be further inferred that the thickness of the nitrogen-doped graphene can be controlled by controlling the ammoniation time. Moreover, the nitrogen-doped graphene with the two thicknesses may basically maintain the morphology of complete particles, without showing the phenomenon of a large-scale agglomeration.

Figure 4:
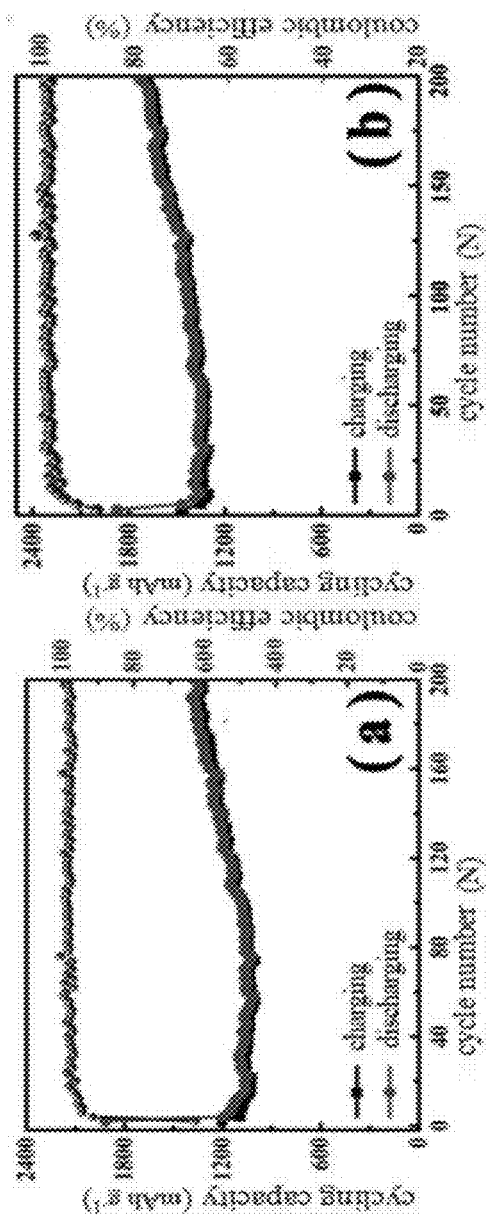
FIG. 4 is a diagram showing the electrochemical cycling performance of two SiC nanoparticles encapsulated by nitrogen-doped graphene with different thicknesses at a current density of $0.1 \text{ A·g}^{-1}$ in an example of the present disclosure.

As shown in FIG. 4, which is a diagram showing the electrochemical cycling performance of two SiC nanoparticles encapsulated by nitrogen-doped graphene with different thicknesses at a current density of 0.1 $A \cdot g^{-1}$, (a) represents the SiC nanoparticle encapsulated by nitrogen-doped graphene with a graphene thickness of 10 nm, and (b) represents the SiC nanoparticle encapsulated by nitrogen-doped graphene with a graphene thickness of 20 nm. The electrochemical performance test as shown in FIG. 4 illustrates that when the thickness of the nitrogen-doped high-quality graphene is 10 nm, the electrode has a capacity of 1347.7 $mAh \cdot g^{-1}$ after 200 cycles at a current density of 0.1 $A \cdot g^{-1}$; when the thickness of the nitrogen-doped high-quality graphene is increased to 20 nm, the capacity of the electrode may reach 1719.5 $mAh \cdot g^{-1}$ after 200 cycles at a current density of 0.1 $A \cdot g^{-1}$. Therefore, it may be seen that the greater the thickness of the nitrogen-doped graphene encapsulating the surface of the SiC nanoparticles is, the greater the cycling capacity of the battery is, and the greater the electric energy storage capacity of the battery is.

Figure 5:
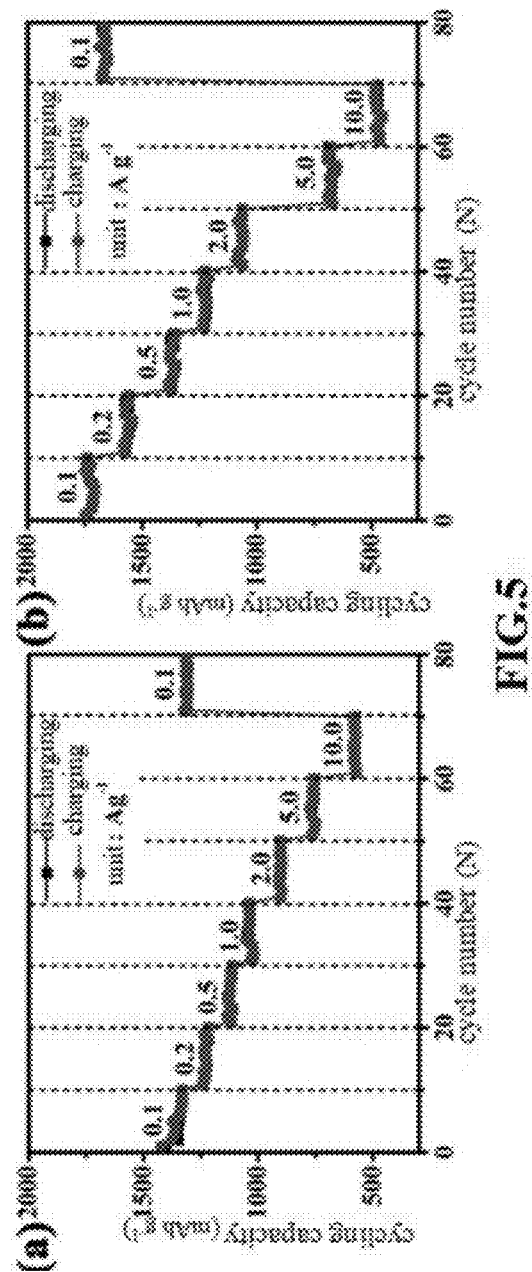
FIG. 5 is a diagram showing the electrochemical rate capability of two SiC nanoparticles encapsulated by nitrogen-doped graphene with different thicknesses in an example of the present disclosure.

As shown in FIG. 5, which is a diagram showing the electrochemical rate capability of two SiC nanoparticles encapsulated by nitrogen-doped graphene with different thicknesses. It may be seen from FIG. 5 that the electrode of SiC nanoparticles encapsulated by nitrogen-doped graphene with a thickness of 10 nm has a discharge specific capacity of 1352.4 $mAh \cdot g^{-1}$ after 10 cycles at a current density of 0.1 $A \cdot g^{-1}$. When the current density increases to 0.2 $A \cdot g^{-1}$, the capacity remains stable, and the discharge specific capacity could maintain at 1238.6 $mAh \cdot g^{-1}$ after 10 cycles. When the current density gradually increases to 0.5 $A \cdot g^{-1}$, 1.0 $A \cdot g^{-1}$, 2.0 $A \cdot g^{-1}$ and 5.0 $A \cdot g^{-1}$, the corresponding specific capacities are 1136.2 $mAh \cdot g^{-1}$, 1085.3 $mAh \cdot g^{-1}$, 876.2 $mAh \cdot g^{-1}$ and 756.8 $mAh \cdot g^{-1}$, respectively, and remain stable. When the current density continues to increase to 10 $A \cdot g^{-1}$, the corresponding specific capacity is 623.2 $mAh \cdot g^{-1}$. More importantly, when the current density decreases from 10.0 $A \cdot g^{-1}$ to the initial current density (0.1 $A \cdot g^{-1}$), the corresponding capacity could restore to the original capacity. The electrode of SiC nanoparticle encapsulated by nitrogen-doped graphene with a thickness of 20 nm has a discharge specific capacity of 1723.6 $mAh \cdot g^{-1}$ after 10 cycles at a current density of 0.1 $A \cdot g^{-1}$. When the current density increases to 0.2 $A \cdot g^{-1}$, the capacity remains stable, and the discharge specific capacity could maintain at 1593.7 $mAh \cdot g^{-1}$ after 10 cycles. When the current density gradually increases to 0.5 $A \cdot g^{-1}$, 1.0 $A \cdot g^{-1}$, 2.0 $A \cdot g^{-1}$ and 5.0 $A \cdot g^{-1}$, the corresponding specific capacities are 1345.8 $mAh \cdot g^{-1}$, 1246.1 $mAh \cdot g^{-1}$, 1062.8 $mAh \cdot g^{-1}$ and 741.3 $mAh \cdot g^{-1}$, respectively, and remain stable. When the current density continues to increase to 10 $A \cdot g^{-1}$, the corresponding specific capacity is 633.1 mAh·g$^{-1}$. More importantly, when the current density decreases from 10.0 A·g$^{-1}$ to the initial current density (0.1 A·g$^{-1}$), the corresponding capacity could restore to the original capacity.

In conclusion, under the condition that the thickness of the nitrogen-doped high-quality graphene is increased from 10 nm to 20 nm, the rate capabilities of the obtained electrode material are superior to those of the original SiC nanoparticles and the SiC nanoparticles encapsulated by undoped graphene at different current densities.

It should be understood that the application of the present disclosure is not limited to the above examples. Improvements or changes could be made by those skilled in the art based on the above description, and all these improvements and changes should fall within the protection scope of the appended claims of the present disclosure.

What is claimed is:

1. A method for preparing an anode material for lithium ion battery of a SiC nanoparticle encapsulated by nitrogen-doped graphene, comprising:
    heating a SiC nanoparticle for a predetermined time in an ammonia atmosphere; and
    cooling to obtain the SiC nanoparticle encapsulated by nitrogen-doped graphene.

2. The method of claim 1, comprising:
    weighing a certain mass of SiC nanoparticles and placing in a container, and placing the container with the certain mass of SiC nanoparticles in a heating system;
    evacuating air in the heating system, and introducing ammonia into the heating system until the heating system reaching a normal pressure;
    heating the heating system while continuously introducing the ammonia into the heating system; and
    turning off a power supply, stopping introducing the ammonia, and naturally cooling the heating system to room temperature in the ammonia.

3. The method of claim 1, wherein the SiC nanoparticle encapsulated by the nitrogen-doped graphene has a diameter of 100-300 nm.

4. The method of claim 2, wherein the container is a horizontal high-temperature tube furnace with a single temperature zone, and the SiC nanoparticles are placed in a middle position of a furnace tube of the horizontal high-temperature tube furnace with the single temperature zone.

5. The method of claim 4, wherein the horizontal high-temperature tube furnace with the single temperature zone is equipped with an air extraction device, and the air extraction device allows evacuating air pressure inside the horizontal high-temperature tube furnace with the single temperature zone.

6. The method of claim 5, wherein the horizontal high-temperature tube furnace with the single temperature zone is further equipped with an air charging device, and after the air inside the horizontal high-temperature tube furnace with the single temperature zone is evacuated to a negative pressure, the air charging device is used to introduce the ammonia into the horizontal high-temperature tube furnace with the single temperature zone, until the pressure in the horizontal high-temperature tube furnace with the single temperature zone returns to the normal pressure.

7. The method of claim 6, wherein the heating of the horizontal high-temperature tube furnace with the single temperature zone is performed by increasing a temperature to 1500° C. at a heating rate of 10° C. per minute, and holding for a certain time at 1500° C.

8. The method of claim 7, wherein the time for holding at 1500° C. of the horizontal high-temperature tube furnace with the single temperature zone is 5-10 min.

9. The method of claim 8, wherein after the temperature holding of the horizontal high-temperature tube furnace with the single temperature zone is completed, the power supply is turned off, and the horizontal high-temperature tube furnace with the single temperature zone is naturally cooled to room temperature, with the SiC nanoparticle being prepared into the SiC nanoparticle encapsulated by nitrogen-doped graphene.

* * * * *